(12) United States Patent
Wrigley et al.

(10) Patent No.: US 7,603,496 B2
(45) Date of Patent: Oct. 13, 2009

(54) BUFFERING DATA DURING DATA TRANSFER THROUGH A PLURALITY OF CHANNELS

(75) Inventors: Christopher Edwin Wrigley, Saffron Walden (GB); David John Gwilt, Cambridge (GB)

(73) Assignee: ARM Limited, Cambridge (GB)

( * ) Notice: Subject to any disclaimer, the term of this patent is extended or adjusted under 35 U.S.C. 154(b) by 302 days.

(21) Appl. No.: 11/337,111

(22) Filed: Jan. 23, 2006

(65) Prior Publication Data
US 2007/0174513 A1   Jul. 26, 2007

(51) Int. Cl.
G06F 3/00   (2006.01)
G06F 13/36  (2006.01)

(52) U.S. Cl. .......................... 710/52; 710/113
(58) Field of Classification Search .............. 710/52, 710/113
See application file for complete search history.

(56) References Cited

U.S. PATENT DOCUMENTS

| | | | |
|---|---|---|---|
| 4,692,894 A * | 9/1987 | Bemis ........................ | 710/57 |
| 5,109,496 A * | 4/1992 | Beausoleil et al. .......... | 711/207 |
| 5,905,725 A * | 5/1999 | Sindhu et al. ............... | 370/389 |
| 5,983,301 A * | 11/1999 | Baker et al. ................. | 710/113 |
| 2003/0121030 A1 * | 6/2003 | Koob et al. .................. | 717/152 |
| 2005/0041450 A1 * | 2/2005 | Duh et al. .................... | 365/1 |

OTHER PUBLICATIONS

Definition of 'disk cache' from www.xreferplus.com, 2006: Hughton Mifflin Company.*

* cited by examiner

*Primary Examiner*—Henry W. H. Tsai
*Assistant Examiner*—Hyun Nam
(74) *Attorney, Agent, or Firm*—Nixon & Vanderhye P.C.

(57) ABSTRACT

A buffer is disclosed for storing data being transferred using a plurality of control channels, a data item of said data being transferred between a data source and a data destination using one of said plurality of control channels, said buffer comprising: a data input port operable to receive said data being transferred using said plurality of control channels; a data output port operable to output data to be transferred using said plurality of control channels; and a data store operable to store data received from said data input port prior to it being output by said data output port, said data store comprising a plurality of storage locations each operable to store a data item, said storage locations being arranged in groups, a storage location being allocated to a group in dependence on the control channel that a data item that it stores is received from, such that each group comprises storage locations storing data items received from a same one of said plurality of control channels. Free storage locations are not allocated to any of the plurality of groups, so that new data items received can be stored in any of the free storage locations, these locations then being allocated to the group corresponding to the channel being used.

19 Claims, 15 Drawing Sheets

US 7,603,496 B2

BUFFERING DATA DURING DATA TRANSFER THROUGH A PLURALITY OF CHANNELS

BACKGROUND OF THE INVENTION

1. Field of the Invention

This invention relates to the field of data processing systems. More particularly, this invention relates to the field of direct memory access controllers.

2. Description of the Prior Art

Direct memory access (DMA) controllers are used to control the transfer of data between memory and other peripheral devices or between different memories without the data passing through the CPU. DMA controllers can have a plurality of control channels that are set up in hardware and that are used for data transfers between a data source and data destination. Some control channels may be dedicated to a particular device while other devices may be able to select a free channel to use. To initiate a data transfer between for example a peripheral device and memory, the peripheral device driver sets up one of the DMA channels and then transfers a burst of data that may consist of several data items using this control channel. It should be noted that the data transferred from the peripheral may not be bursty, however, it is more efficient to burst the data to memory so it has been found to be advantageous to buffer this data by collecting it and merging it together before performing the burst to the data destination, in this case the memory. Thus, in devices of the prior art such as ARM PL080/PL081 DMA controllers (see http://www.arm.com/documentation/SoC/index.html, ARM PrimeCell (PL080) DMA Controller Revision r1p3 Technical Reference Manual (1 Mb .pdf) Ref: DDI0196G, Issued: 21 Dec. 2005, and ARM PrimeCell (PL081) Single Master DMA Controller r1p2 Technical Reference Manual (990 Kb .pdf) Ref: DDI 0218E, Issued: 21 Dec. 2005. ) there is provided a data store in the form of a FIFO (first in first out buffer) for each DMA channel. Each of the FIFOs must be sized to accommodate a certain maximum data burst, which results in a large amount of storage which is rarely fully utilised. This leads to two problems, one that there is a large gate-count/area to accommodate this storage and secondly that the FIFOs are often too small.

SUMMARY OF THE INVENTION

A first aspect of the present invention provides a buffer for storing data being transferred using a plurality of control channels, a data item of said data being transferred between a data source and a data destination using one of said plurality of control channels, said buffer comprising: a data input port operable to receive said data being transferred using said plurality of control channels; a data output port operable to output data being transferred using said plurality of control channels; and a data store operable to store data received from said data input port prior to it being output by said data output port, said data store being operable to store said data as a plurality of groups of data items, wherein each group comprises data items received from a same one of said plurality of channels, and each data item within said group is stored in a storage location, said data store comprising free storage locations being storage locations not currently storing valid data, wherein said data store is operable to store a data item received at said data input in one of said free storage locations and then to allocate said one of said free storage locations to a respective group in dependence on said channel said data item was received from.

By providing data storage in the form of a data store in which the data items are stored in groups of data items for each control channel, the storage locations within the data store can be allocated to a particular group as they are required. This reduces pre-allocation of data storage locations and thereby enables the available storage space to be used efficiently where it is needed. This enables the data store to be smaller while still providing a required storage capacity for a particular channel at a particular time.

In some embodiments said data items within each group are stored in the form of a linked list, with each data item being stored in a storage location comprising storage space for a data value and a pointer value associated with said data value, said pointer value indicating a storage location of a subsequent data item within said linked list.

Forming the groups as linked lists with pointers used to indicate subsequent storage locations within the linked lists is a convenient way of allocating storage locations to a particular subset of the whole data store in a dynamic way.

Although there may be more linked lists than there are channels, in some embodiments, said plurality of linked lists corresponds to said plurality of channels.

In some embodiments, said free storage locations form a free linked list, storage locations within said free linked list including storage space for a pointer value, said pointer value indicating a subsequent storage location in said free linked list.

It has been found to be convenient to indicate storage locations which are free to receive data items, i.e. those not currently storing valid data, in the form of a linked list too. Thus, control of reading and writing to this linked list can be provided in much the same way as to the other lists using pointers.

In some embodiments, said buffer is operable in response to receipt of a reset signal to allocate all of said storage locations to said free linked list, said buffer further comprising a counter, said counter being operable to set said pointers associated with said all of said storage locations to indicate subsequent storage locations.

At reset no data items are stored and thus, it is convenient to indicate that all storage locations form part of the free list. One convenient way of doing this is to use a counter to set the pointer values. This is because the pointer values will point to consecutive storage locations and thus the values can be set simply and efficiently using a counter.

In some embodiments, said buffer further comprises: control logic; and a plurality of registers, comprising at least two registers corresponding to each of said linked lists, one of said two registers being operable to store a linked list write pointer indicating a storage location of a most recently stored data item for said corresponding linked list and said other of said two registers being operable to store a linked list read pointer, said read pointer indicating a storage location comprising a next data item to be output from said corresponding linked list.

A convenient way of controlling the writing of data to and the reading of data from a linked list is to use pointer values indicating where the data should be written to and where it should be read from. These pointer values can be stored in registers such that they are both simple and quick to access.

In some embodiments, said buffer further comprises a further plurality of registers corresponding to said plurality of linked lists and operable to store a value indicative of whether a respective linked list is empty or not.

In some embodiments, a further register for each linked list is provided, this register indicates if the linked list in other words the virtual FIFO is empty. This allows a system to determine whether data is available for a given linked list, thus preventing FIFO under-runs, clogging of the read port or lock-ups.

In some embodiments, the buffer comprises a plurality of data valid outputs associated with said data input port, said plurality of data valid outputs being associated with said further plurality of registers and being operable to output a signal indicating if said linked list is empty or not.

By linking the registers to data valid outputs, the information that a linked list is empty can be made available to external logic in a straightforward fashion and this information can then be used by the external logic to avoid attempting to read from a linked list which is currently empty, thus stalling the external system In some embodiments, said buffer further comprises a buffer full register operable to store a value indicative of whether said buffer is full or not.

Providing a buffer full register enables information regarding whether or not the data store is full to be provided.

In some embodiments, said buffer comprises a buffer ready output associated with said write port and being controlled by a value stored in said buffer full register, said buffer ready output being operable to output a signal indicative of whether said buffer is full or not.

Providing a signal alongside the write port indicative of whether the buffer is full, allows external logic to know if the data store is ready to receive data by handshaking with it or not, this impedes FIFO over-runs.

In some embodiments, said buffer further comprises at least one reservation counter operable to hold a value, said value indicating a certain number of storage locations reserved for one of said groups.

It may be convenient to reserve a certain number of storage locations for at least one of the groups. This can prevent one group of data items filling the whole of the data store and impeding any other channels from transferring data. One simple way of doing this is by the use of a counter, the counter value can then be used in association with the buffer full register to provide an indication to the write port as to whether or not data can be written to a particular group. A counter is useful for this as, as data is written to or read from the group the counter can be updated to reflect the changing number of reserved unallocated storage locations.

In some embodiments, said buffer further comprises a register operable to store a free write pointer operable to indicate a location at a tail of said free linked list.

The provision of a register operable to store a free write pointer indicating a location at a tail of said free linked list enables the buffer to know where to append a newly freed storage location to. When data is output from a virtual FIFO, the storage location that stored the data that was output is now free and thus, should be appended to the tail of the free list. The free write pointer enables the tail of the free list to be easily located. On appending a newly freed storage location to the tail of the free list, the free write pointer is updated to point to this storage location.

In some embodiments, said buffer further comprises a register operable to store a free read pointer, said free read pointer indicating a location at a head of said free linked list, that is a storage location for storing a next data item to be written to said buffer.

A free read pointer indicating the head of the free linked list indicates where the next empty storage location is for storing a next data item written to the buffer.

In some embodiments, said buffer further comprises: control logic; and a plurality of registers, comprising at least two registers corresponding to each of said linked lists, one of said two registers being operable to store a linked list write pointer indicating a storage location of a previously stored data item for said linked list and said other of said two registers being operable to store a linked list read pointer, said linked list read pointer indicating a storage location comprising a next data item to be output from said linked list; wherein on receipt of said data item at said data input port transferred under control of said one of said plurality of channels said control logic is operable to control said buffer to: store said data item in a storage location indicated by said free read pointer; update a write pointer of a linked list associated with said one of said plurality of channels with said free read pointer and update said free read pointer with a pointer value stored associated with said storage location and update said pointer value stored associated with said storage location to point to a storage location of a data item in a location associated with a previously received data item transferred using said one of said plurality of channels.

The provision of control logic within the buffer allows data items that are received to be stored in the appropriate linked lists by the updating of the appropriate pointer values. It also allows the data to be written from the lists and updates register values such that the status of the buffer and the lists within the buffer can be communicated to external logic.

A further aspect of the present invention provides a direct memory access controller comprising: a buffer according to a first aspect of the present invention; a plurality of control channels operable to hold state information regarding data transfer between a plurality of data sources and a plurality of data destinations; execution logic; and a bus interface unit operable to receive data from a data source and to transfer said data to said buffer using one of said control channels and to receive said data from said buffer and to route said data to said data destination using said one of said control channels.

A direct memory access controller having a buffer according to a first aspect of the present invention provides the advantages of an apparent increase in storage space, in that the maximum number of storage locations for each channel is increased without actually increasing the physical gate count.

In some embodiments, said execution logic is operable to control transfer of said data using said plurality of channels.

Execution logic associated with the DMA controller can control the transfer of data using the control channels and associating them with a particular group of data items.

A yet further aspect of the present invention provides a method of storing data being transferred using a plurality of control channels, a data item of said data being transferred between a data source and a data destination using one of said plurality of control channels, said data being stored within a data store comprising a plurality of storage locations, said storage locations being arranged in groups within said data store, each group comprising storage locations storing data items received from a same one of said plurality of control channels, said method comprising the steps of: receiving said data item being transferred using said one of said plurality of control channels at a data input; storing said data item received from said data input port in a free storage location within said data store, said free storage location being one not currently storing valid data and allocating said free storage location to a group in dependence on said one of said plurality of control channel that said data item is received from; and outputting said data item from said data store to said one of said plurality of control channels at a data output port.

A still further aspect of the present invention provides a computer-readable program product comprising a computer program for controlling a computer to perform a method according to the yet further aspect of the present invention.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
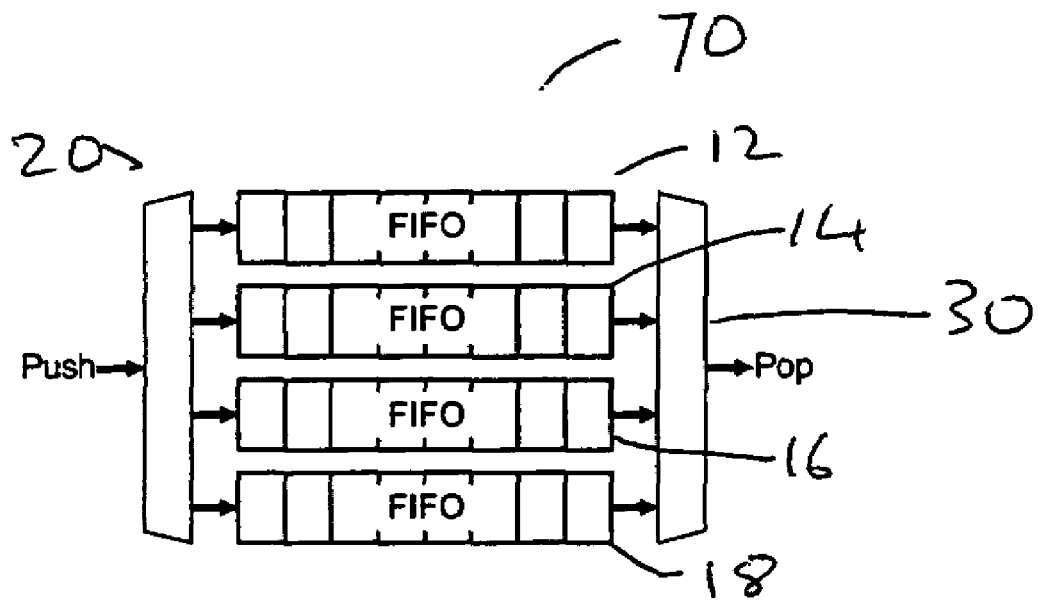
FIG. 1 schematically illustrates a data store according to an embodiment of the present invention.

FIG. 1 schematically shows a functional view of a data store 70 used to buffer data during a data transfer controlled by a DMA according to an embodiment of the present invention. Data store 70 is arranged in such a way that it can be viewed functionally as a data store 70 having a plurality of virtual FIFOs, 12, 14, 16 and 18, each operable to store data being transferred under control of a particular DMA channel. Thus, data store 70 can be viewed as a Multi-FIFO which models a set of parallel virtual FIFOs which are multiplexed together to expose only a single read port and a single write port, the selection of which virtual FIFO to access is made based upon separate select/ID lines to each port or interface. Virtual FIFO is the term used to refer to one of the apparent FIFOs modeled within data store 70.

Data store 70 comprises an input or write port 20 operable to receive data from a particular channel and push it into the corresponding virtual FIFO and an output or read port 30, operable to pop data out of a particular FIFO and send it to its data destination under control of its respective control channel. Thus, each virtual FIFO is tied to a particular control channel of the DMA. Thus, a single buffer provides storage for the plurality of channels by using a plurality of virtual FIFOs. This has the advantage that the whole capacity of the data store is not allocated in advance to particular channels allowing storage locations to be allocated in a dynamic way as they are needed. Thus, an efficient use can be made of the storage space. At reset (either hardware reset or an initialisation sequence) the pointers are set such that the entire data store 70 comprises a single contiguous list known as the "free list".

Figure 2:
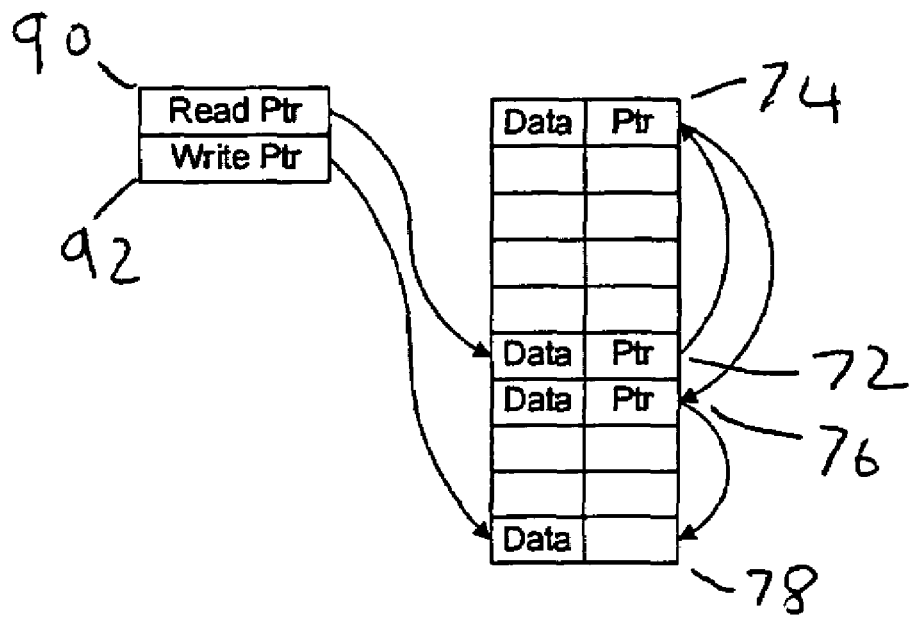
FIG. 2 schematically shows the data store of FIG. 1.

FIG. 2 schematically shows data store 70 and how individual data items 72 are stored within a virtual FIFO. A read pointer 90 associated with one of the virtual FIFOs indicates the head storage location 72 of that virtual FIFO. Each virtual FIFO is formed of a linked list of storage locations. Each of the storage location can store a data item and a pointer indicating the storage location of a subsequent data item. Thus, storage location 72 comprises a data item, and a pointer indicating the storage location 74 of a subsequent data item. This subsequent data item has a pointer indicating storage location 76 of a subsequent data item and so on. The final storage location at the tail of the linked list 78 is pointed at both by the write pointer 92 of that particular linked list and by the pointer associated with the preceding data item stored in storage location 76.

In addition to linked lists associated with each Virtual FIFO, the remaining unallocated storage locations form a "free" linked list of their own. The head of this free linked list is indicated by a read pointer, while the current tail of the list is indicated by a write pointer.

When a data item is to be read from the linked list shown, the read pointer 90 is accessed and then data item from storage location 72 is output. Read pointer 90 is then updated with the pointer value stored in storage location 72. The storage location 72 is then added to the tail of the free linked list. The write pointer of the free linked list is then updated with the previous value of the read pointer 90.

When a data item is written to the list shown the pointer value of storage location 78 is updated with the location of the new data item and the VFIFO write pointer is also updated with this value. The new data item is written to the location indicated by the read pointer of the free linked list, thus, it is this value that is stored in the pointer part of storage location 78 and in the VFIFO write pointer. The read pointer for the free linked list is then updated with the subsequent storage location of the free linked list.

Figure 3:
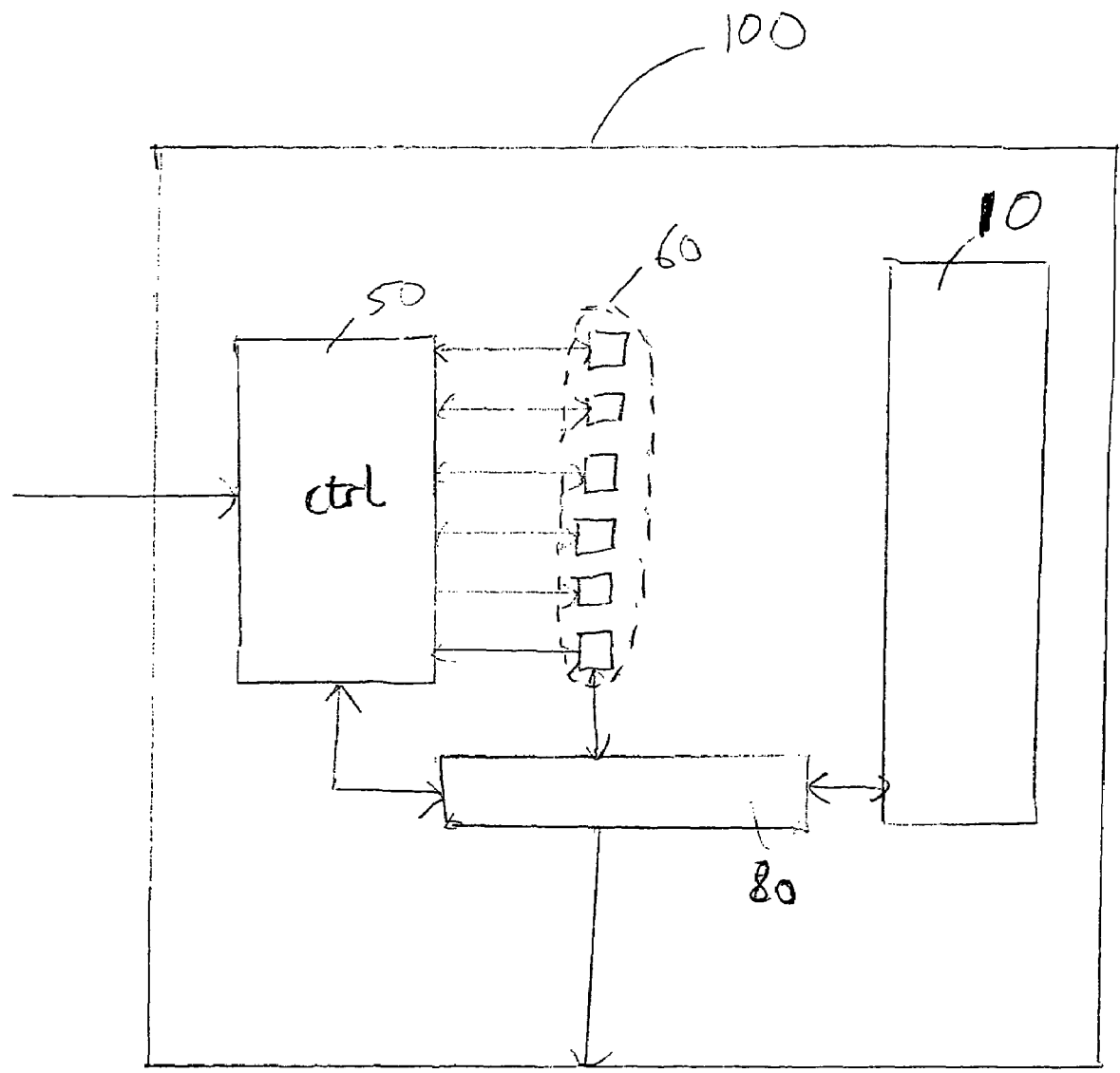
FIG. 3 shows a DMA controller according to an embodiment of the present invention.

FIG. 3 shows a DMA controller 100 comprising a buffer 10, control logic 50, control channels 60 and a bus interface unit 80. Data being transferred from one of a plurality of data sources to one of a plurality of data destinations is transferred using one of the control channels 60. Each of the control channels 60 can be considered as a single thread of operation comprising a sequence of instructions to set the parameters for one or more DMA transfers and to carry out those transfers. The data transfers themselves occur via the bus interface unit 80 which is controlled by control logic 50 in response to information from a particular control channel 60.

Figure 4:
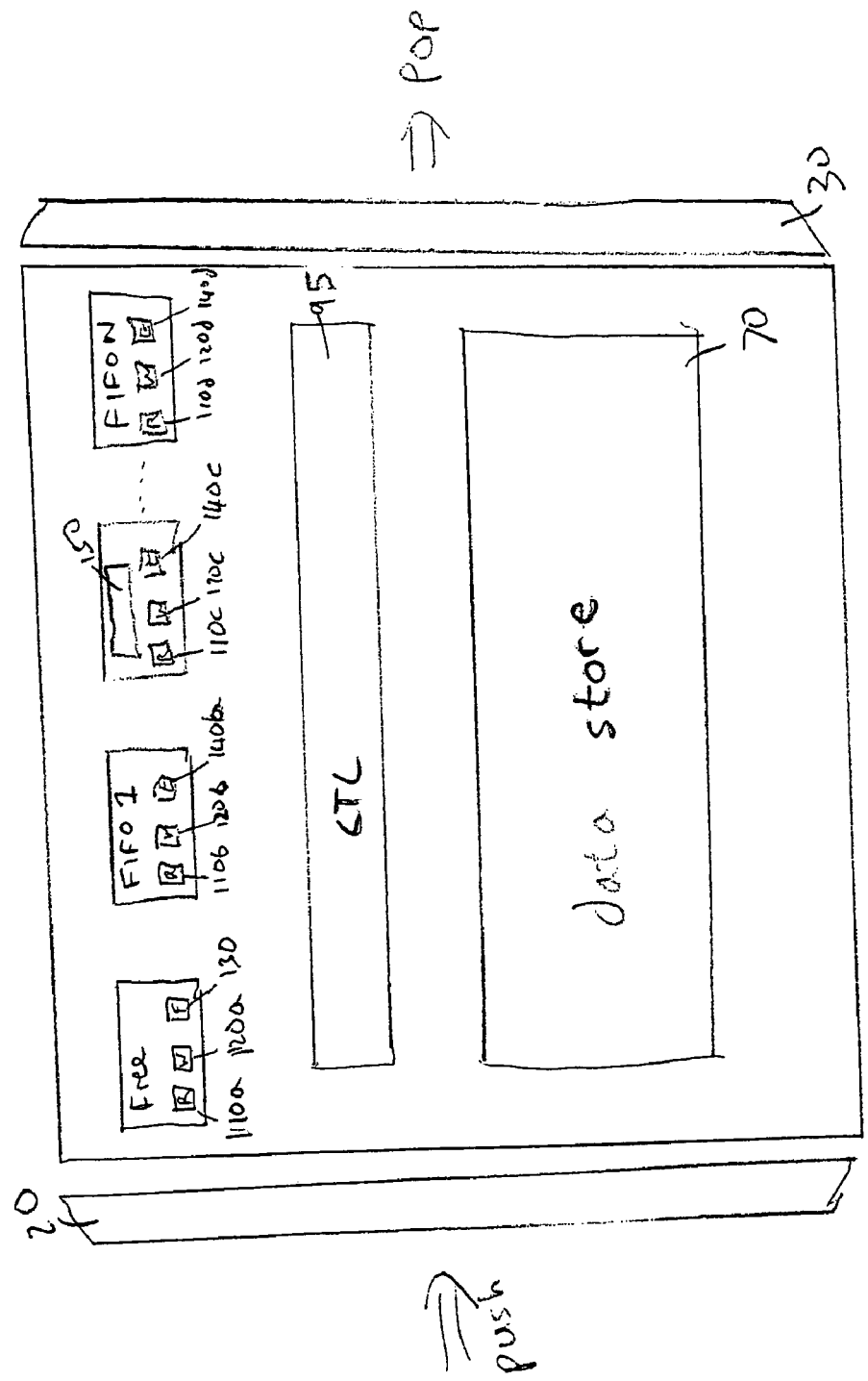
FIG. 4 schematically shows a buffer according to an embodiment of the present invention.

FIG. 4, is a schematic diagram showing individual components of buffer 10. Buffer 10 comprises data store 70 for storing data items along with an associated pointer, control logic 95 for controlling data being read to and written from the data store and a plurality of registers which hold pointer values indicating particular storage locations within the data store 70. Each control channel 60 has a virtual FIFO associated with it, and buffer 10 has registers 110a-d, 120a-d, 130 140b-d storing read 110b-d and write 120b-d pointers for each virtual FIFO along with a register 140b-d indicating if the FIFO is empty or not. Furthermore, unused storage locations form a free linked list, thus, there are registers to store a read pointer 110a, a write pointer 120a and a buffer full register 130 associated with that list too.

In addition in some embodiments there is provided a counter 150 associated with one or more channels and operable to dynamically reserve a certain number of storage locations for a particular channel. This can be used to improve latency for certain threads and to prevent one channel from using all the resources of the buffer. This operation is controlled by control logic 95 which needs to take account of the number of places reserved for a particular list and the number of actual free places to determine if the data store 70 should be considered full for some channels.

An embodiment of the present invention is described in more detail below.

Multi-FIFO Concept

It may be advantageous in certain systems to provide support for multiple active AXI transactions, this requires parallel storage of the data packets associated with those transactions. Each packet requires FIFO-like storage, but the number of packets will change dynamically and so the use of a fixed number of FIFOs will be inefficient in many cases.

The Multi-FIFO (MFIFO) is a register or memory-based device which mimics the action of multiple parallel FIFOs connected in such a way that there is only one "push" port and one "pop" port, as is shown in FIG. 1.

The advantage of the MFIFO is that, instead of using multiple individual FIFOs of fixed resource (width, depth), it utilises a single register/memory space which is dynamically allocated (and de-allocated) to individual virtual FIFOs (VFIFOs) on a first-come basis. This allows for the most efficient usage of the available storage resource in both the case where multiple FIFOs are required, and the case where a single FIFO is required (which would be a very inefficient use of parallel FIFOs).

Each FIFO is implemented as a linked-list within the memory space, with a read pointer to store the location of the head of the list and a write pointer to store the location of the tail of the list, as shown in FIG. 2.

The free locations in memory are also identified using a linked-list, with a free pointer to store the location of the head of the list. (Note that for the RTL implementation a pointer for the tail of the free list is also required).

Multi-FIFO Accesses Using the C Model

The following sections describe the operation of the C model. The read pointers for the VFIFOs are stored in the "vf_rd_ptr" array; the write pointers for the VFIFOs are stored in the "vf_wr_ptr" array; the read pointer for the MFIFO free list is stored in the "free_rd_ptr" pointer; the write pointer for the MFIFO free list is stored in the "free_wr_ptr" pointer.

Reads and Writes

Figure 5A:
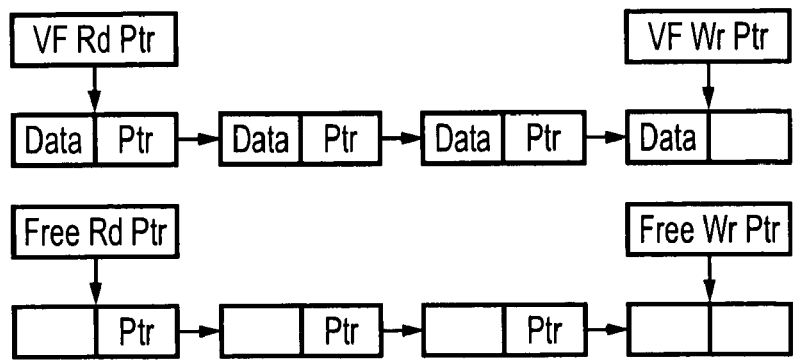
FIG. 5a schematically shows a multi/FIFO which is half full.

FIG. 5A abstracts the arrangement of an 8-element MFIFO which is half filled by a single VFIFO.

Figure 5B:
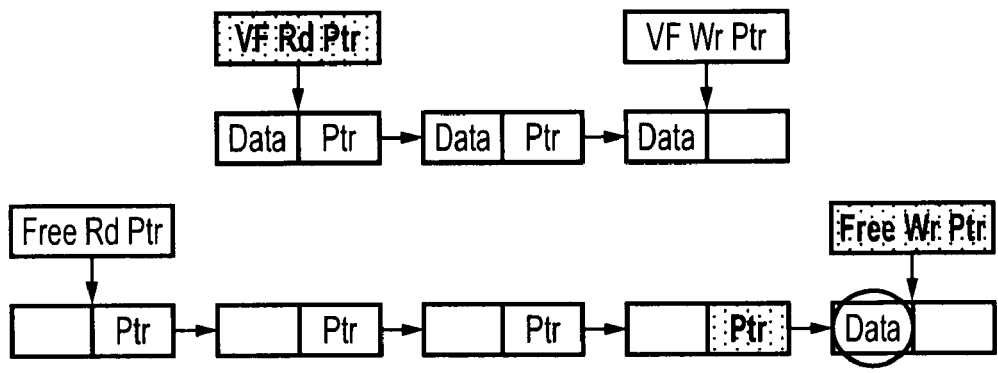
FIG. 5b shows the multi/FIFO of FIG. 5a when a data item is read from it.

When a data item is read from the VFIFO, the head data item is popped, the read pointer is updated, the popped location is appended to the free list and the free pointer is updated. FIG. 5B shows which values are updated when a read is performed on the MFIFO as shown in FIG. 5A. Items ringed have been read from the memory; items shaded have been written to or updated.

Figure 5C:
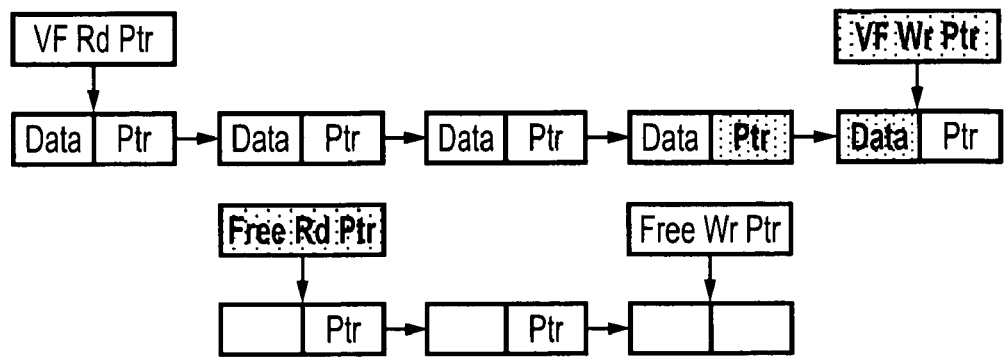
FIG. 5c shows the multi/FIFO of FIG. 5a when a write is performed.

When a data item is written to the VFIFO, the data is pushed into the location at the head of the free list, this location is moved to the tail of the VFIFO list, the write pointer is updated and the free pointer is updated. FIG. 5C shows which values are updated when a write is performed on the MFIFO as shown in FIG. 5A. Items shown shaded have been written to or updated.

Empty Multi-FIFO Accesses

Figure 6A:
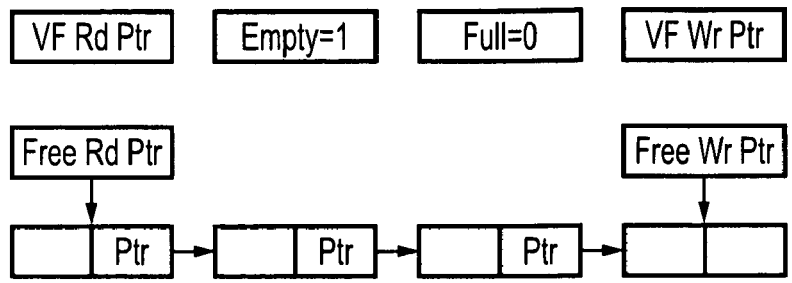
FIG. 6a shows an empty multi/FIFO.

FIG. 6A shows a MFIFO which is currently empty.

Flags indicating the empty status of the VFIFO and the full status of the MFIFO have been added.

Figure 6B:
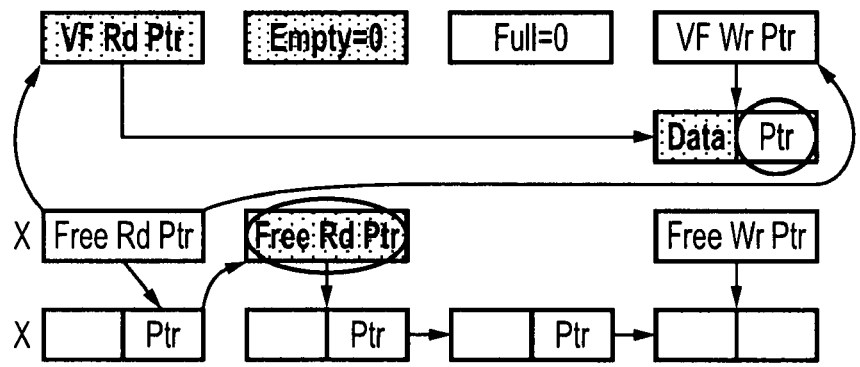
FIG. 6b shows a write to an empty virtual FIFO.

When a data item is written to an empty VFIFO, the data is pushed into the location at the head of the free list, this location is moved to the tail of the VFIFO list, and the write pointer, read pointer and free read pointer are all updated. FIG. 6B shows which values are updated when a write is performed on the VFIFO as shown in FIG. 6A. Items shown as shaded have been written to or updated, those shown ringed have been read from memory and those shown shaded and ringed have been both read from and written to.

Figure 6C:
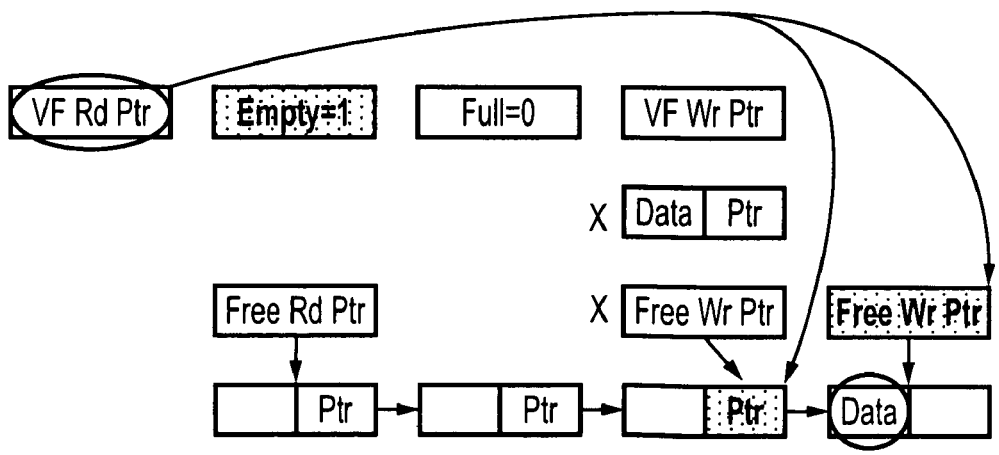
FIG. 6c shows a read of a last data item from the virtual FIFO.

When the last data item is read from a VFIFO, the data item is popped, the popped location is appended to the free list and the free write pointer is updated. FIG. 6C shows which values are updated when a read is performed on the VFIFO as shown in FIG. 6A. Items shown ringed have been read from the memory; items shown shaded have been written to or updated.

Full Multi-FIFO Accesses

Figure 7A:
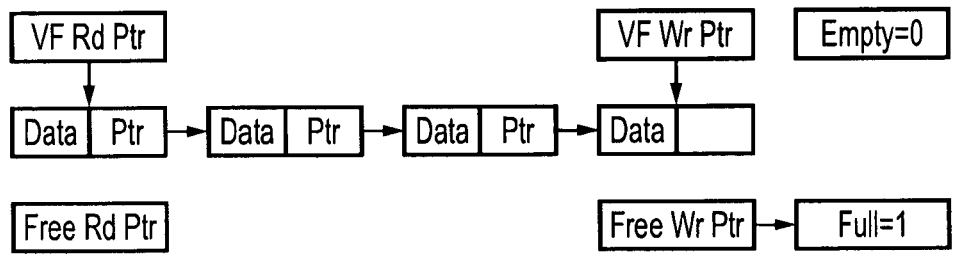
FIG. 7a shows a full multi/FIFO.

FIG. 7A abstracts a 4-element MFIFO which is currently full.

Figure 7B:
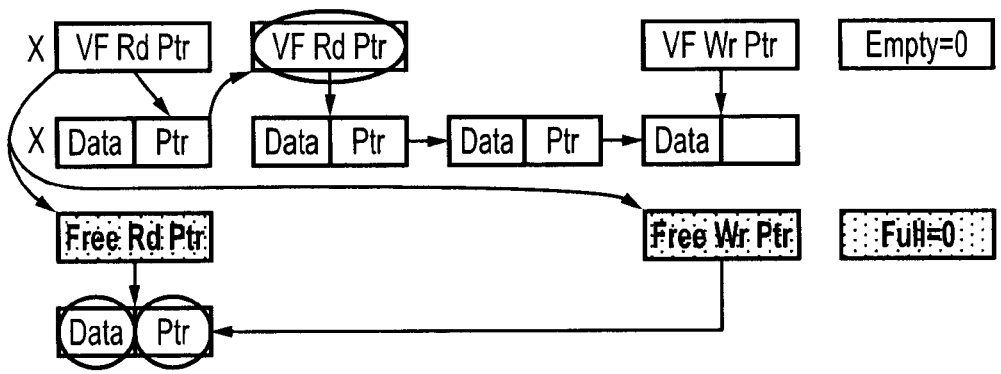
FIG. 7b shows a read from a full multi/FIFO.

When a data item is read from a full multi-FIFO, the head data item is popped, the read pointer is updated, the popped location is added to the free list and the head and tail free pointers are updated. FIG. 7B shows which values are updated when a read is performed on the MFIFO as shown in FIG. 7A. Items shown as ringed have been read from the memory; items shown shaded have been written to or updated.

Figure 7C:
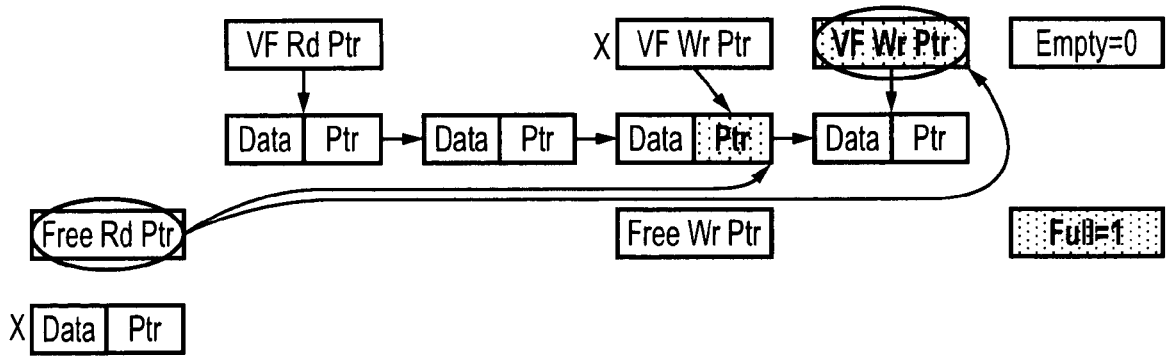
FIG. 7c shows a write to a last free space in a multi/FIFO.

When a data item is written to the last space in the MFIFO, the data is pushed into the location at the head of the free list, this location is moved to the tail of the VFIFO list, and the write pointer is updated. FIG. 7C shows which values are updated when a write is performed on the MFIFO as shown in FIG. 7A. Items shown shaded have been written to or updated.

RTL Issues

Read/Write Clashes

Figure 8A:
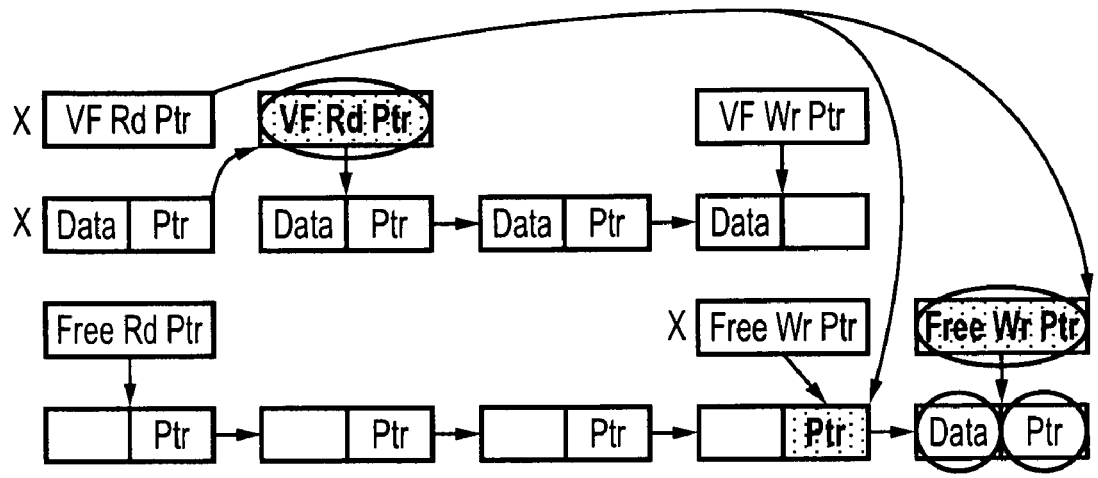
FIG. 8a shows a multi/FIFO read indicating read/write items.
Figure 8B:
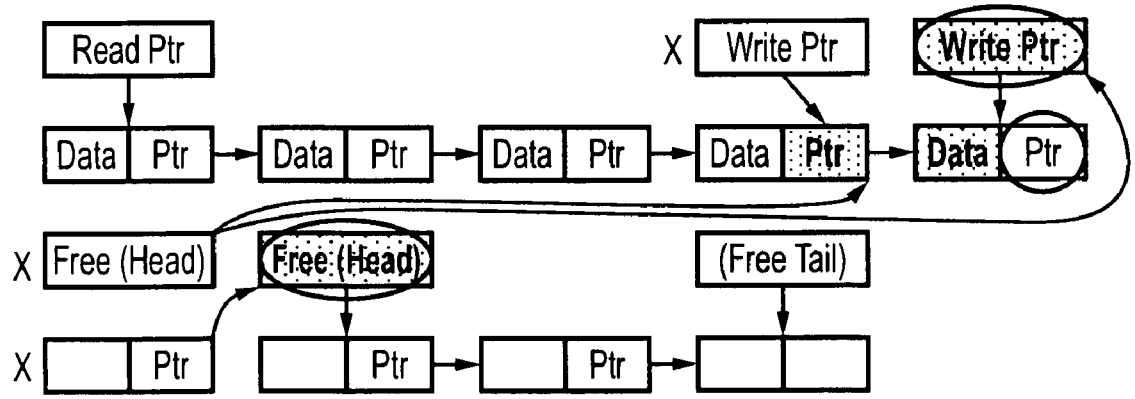
FIG. 8b shows a multi/FIFO write indicating read/write items.

When using a register-based design or a dual-port memory-based design, it is possible to read and write to the same address/bank in the same cycle, however this is not possible with standard single-port memory. The following diagrams illustrate which pointers and data items are both read and written for read and write accesses to a VFIFO. The diagrams are similar to FIG. 5B and FIG. 5A, but previous positions are in faint text with a cross next to them, and items which have been both read and written are shaded and ringed. FIG. 8A shows a Multi-FIFO read showing read/write items FIG. 8B shows a Multi-FIFO write showing read/write items The read pointer, write pointer and free pointer are assumed to be simple registers, and so can be safely read and written in the same access. However, for both reads and writes, one pointer in the array is written to and another is read from. This prevents the use of a single port memory.

Simultaneous Read/write

Figure 9A:
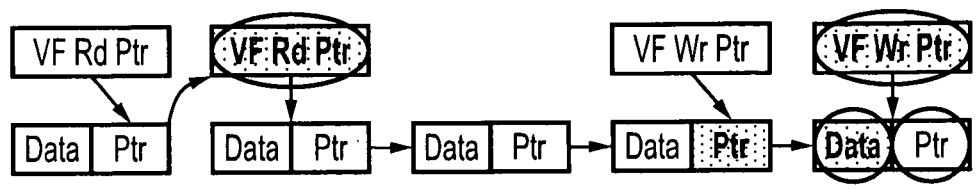
FIG. 9a shows a simultaneous read/write to the same virtual FIFO.
Figure 9B:
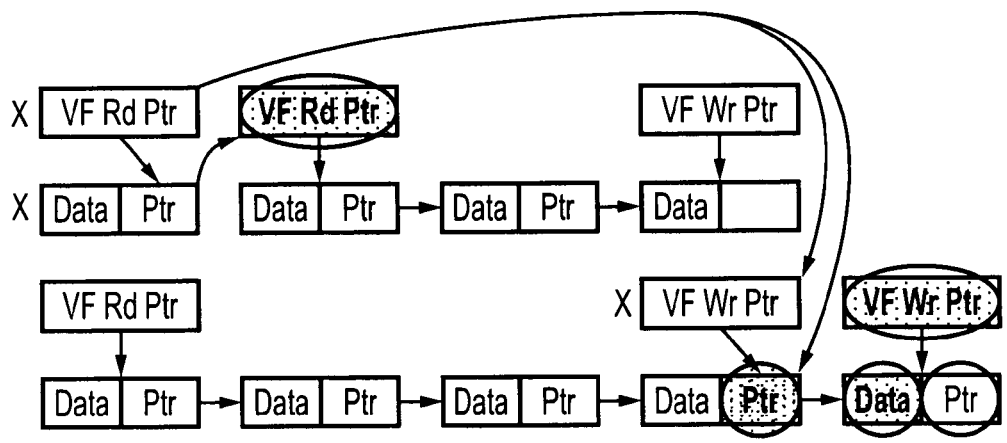
FIG. 9b shows a simultaneous read/write to different virtual FIFO.
Figure 9C:
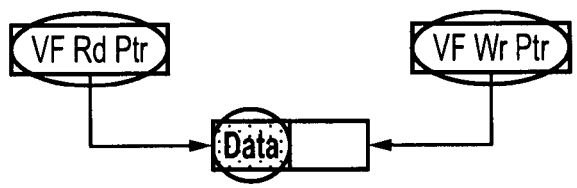
FIG. 9c shows a simultaneous read/write to the same virtual FIFOs last item.
Figure 9D:
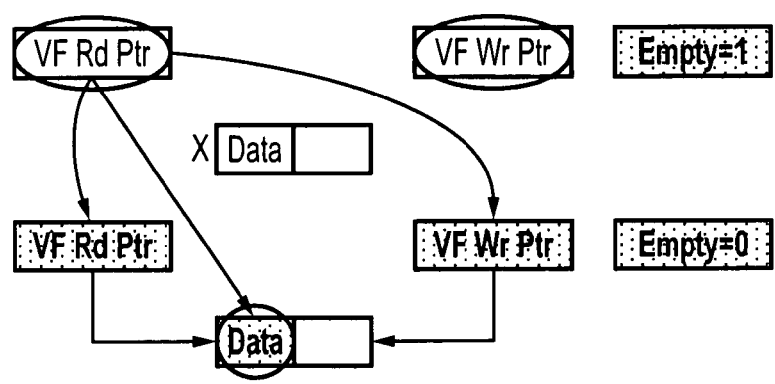
FIG. 9d shows a simultaneous read/write to different virtual FIFOs last/first items.

Simultaneous read/write operations are implemented in the same manner as individual reads or writes, but instead of using the free list to store the popped data item it is immediately recycled for the pushed item. FIG. 9A shows simultaneous read/write, same VFIFO. FIG. 9B shows simultaneous read/write, differing VFIFO. FIG. 9C shows simultaneous read/write, same VFIFO, last item. FIG. 9D shows simultaneous read/write, differing VFIFO, last/first item VFIFO Selection The MFIFO is to be used to allow per-master-ID storage of data packets, and so it is the ID value which selects the VFIFO to use.

For writes, the only information returned by the MFIFO is whether there is space available. This is taken from the single-bit MFIFO Full flag, and is the same for all ID values.

Figure 10:
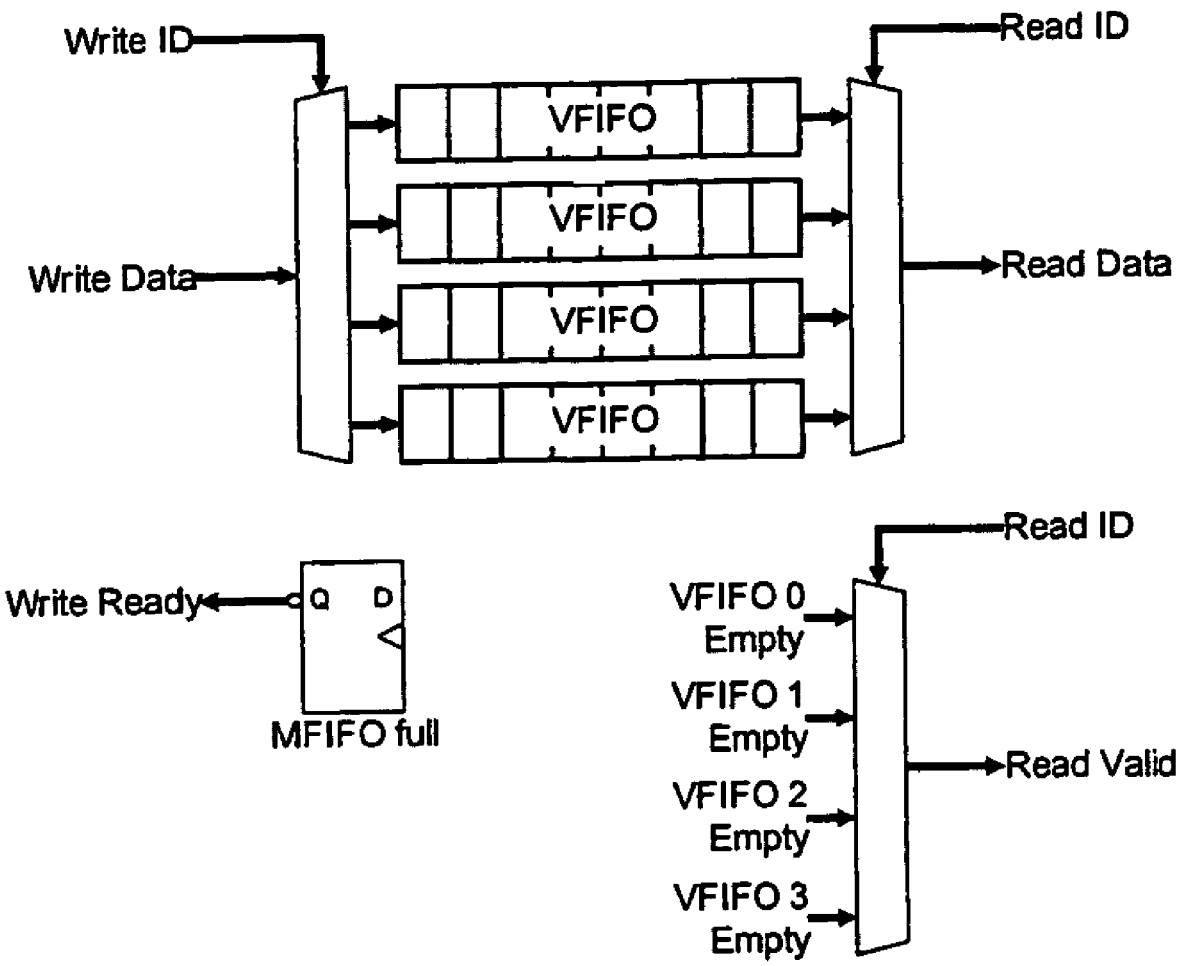
FIG. 10 shows read/write connections to virtual FIFOs.

For reads, the MFIFO must return whether the selected VFIFO is empty or not. This requires a combinatorial path from the ID input bus to the data valid output signal and the read data bus, as shown in FIG. 10. FIG. 10 shows Read/Write connections to VFIFOs.

Linked-List Register Organisation

For greatest efficiency, it would be preferable to organise the linked list (data & pointers) into a single array. However this is not possible because data items and pointers must be accessed from different addresses in the same cycle. The read/write requirements are as follows:

Read Access
    Read data (from current head of VFIFO list)
    Read pointer (from current head of VFIFO list)
    Write pointer (at current tail of free list)

Write Access
    Write data (at current head of free list)
    Read pointer (from current head of free list)
    Write pointer (at current tail of VFIFO list)

Simultaneous Read/write Accesses
    Read data (from current head of VFIFO list)
    Write data (at current head of VFIFO list)
    Read pointer (from current head of VFIFO list)
    Write pointer (at current tail of VFIFO list)

The storage requirements are therefore:
    Dual-port memory array
        Need to allow simultaneous read and write to separate addresses for pointer items, and to the same address for data items
        Preferably with no penalty for back-to-back read-write or write-read sequences
        Can be implemented as a single-port memory which is double-clocked to give apparent dual-port access at the system clock rate.

Additional Functionality

Reset Sequence

On assertion of reset, the MFIFO must be initialised by setting up the free list as a linked-list occupying the whole storage space. This is achieved using an incrementing counter to fill the pointer array. During this sequence, no read/write accesses will be accepted.

Clearing VFIFOs

A DMA packet which is currently being processed may need to be cancelled, e.g. due to an external abort (AXI error response) or other system-level exception. In this case, any VFIFO associated with that packet must be cleared to prevent a "memory leak". This is achieved via a control interface (see section on MFIFO control interface for a port list) which allows a single VFIFO to be cleared.

Clearing a Single VFIFO

Figure 11A:
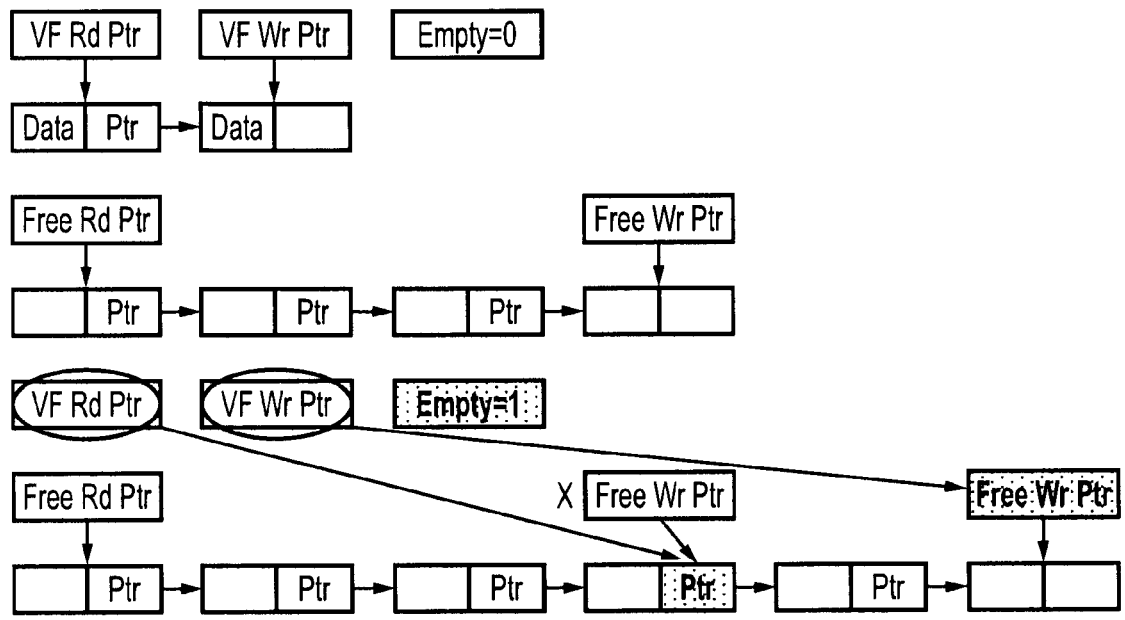
FIG. 11a shows register updates when clearing a virtual FIFO.
Figure 11B:
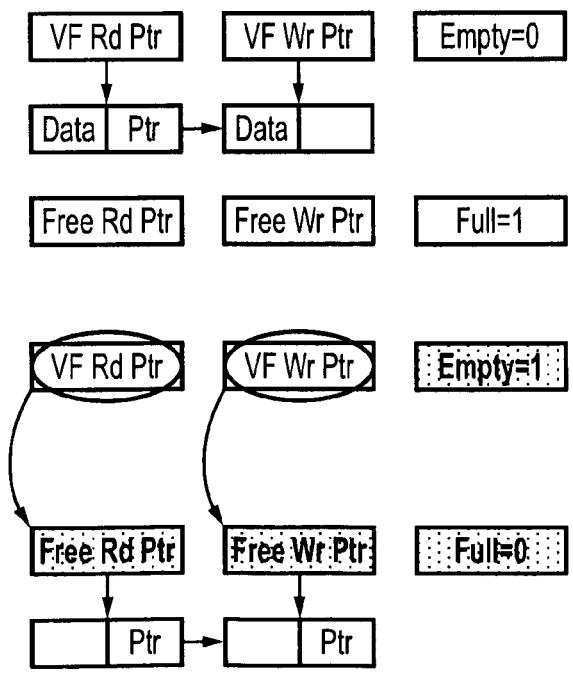
FIG. 11b shows clearing of virtual FIFO when the multi/FIFO is full.

This is achieved by clearing the read and write pointers of the VFIFO, and appending the VFIFO storage to the tail of the free list. This is possible in the same time-frame (i.e. 1 clock cycle) as a normal read/write access. The updates required are illustrated in FIG. 11A., which shows register updates when clearing a VFIFO, while FIG. 11B shows clearing a VFIFO when the MFIFO is full.

The read/write requirements are as follows:

Clearing a VFIFO
    Write pointer (at current tail of free list)

Verilog Specification

Structure

Figure 12:
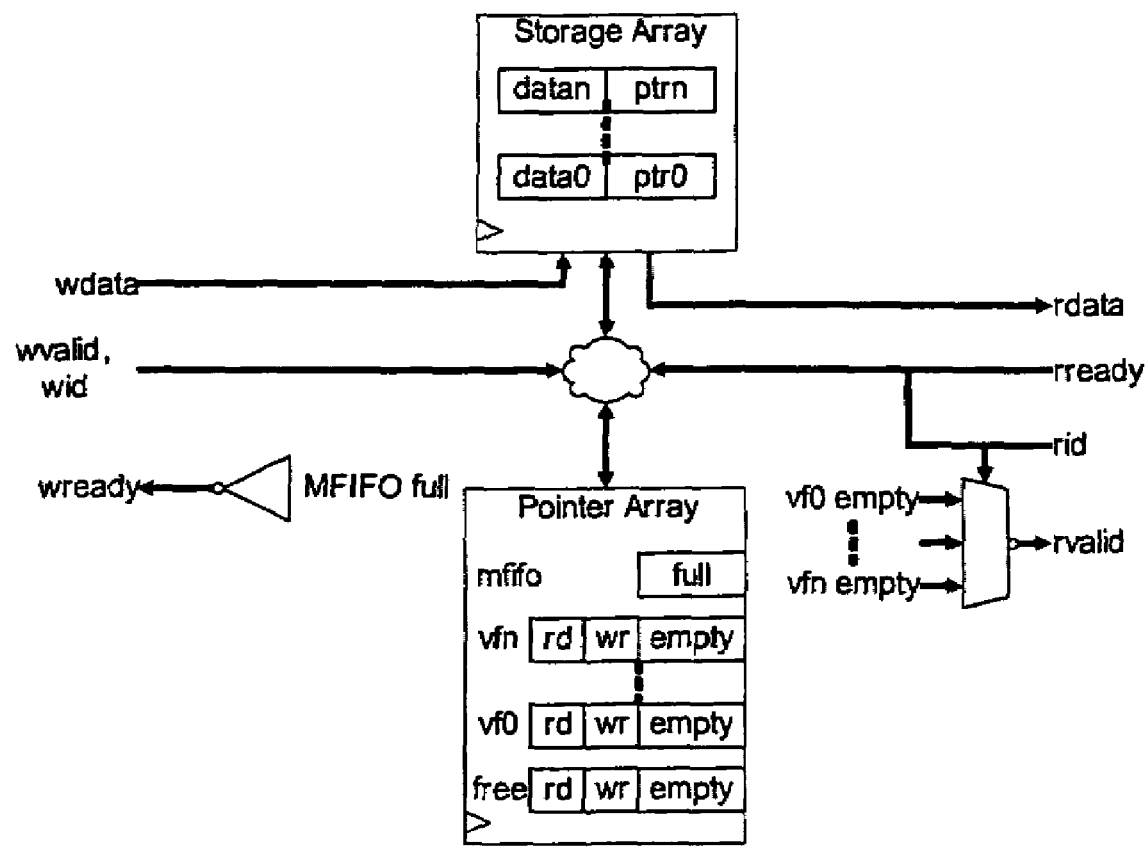
FIG. 12 shows a basic multi/FIFO structure.

In order to provide simple protocols at the MFIFO periphery, the control logic of the block is largely combinatorial. FIG. 12 illustrates the main components of the design required for normal read/write access (i.e. not including the command channel to clear a VFIFO, nor the reset sequencer).
    Central control logic: determines the data and pointer accesses required based upon current inputs and state
    Storage array: memory- or register-based storage of data items and pointer items
    Pointer array: read/write pointers for all lists (VFIFOs and free list), plus full/empty flags Notes:
    The output wready is shown as a simple inversion of mfifo_full. This does not allow for a simultaneous read/write when the MFIFO is full, but improves the timing of the wready output
    Both wready and rvalid are held low during the reset initialisation sequence, and when clearing a VFIFO Storage Array The pointer array is coded within the main body of the MFIFO Verilog. The storage array is coded as a sub-module so that it can either be implemented as a register array (as coded), or replaced by a memory-based sub-block.

Figure 13:
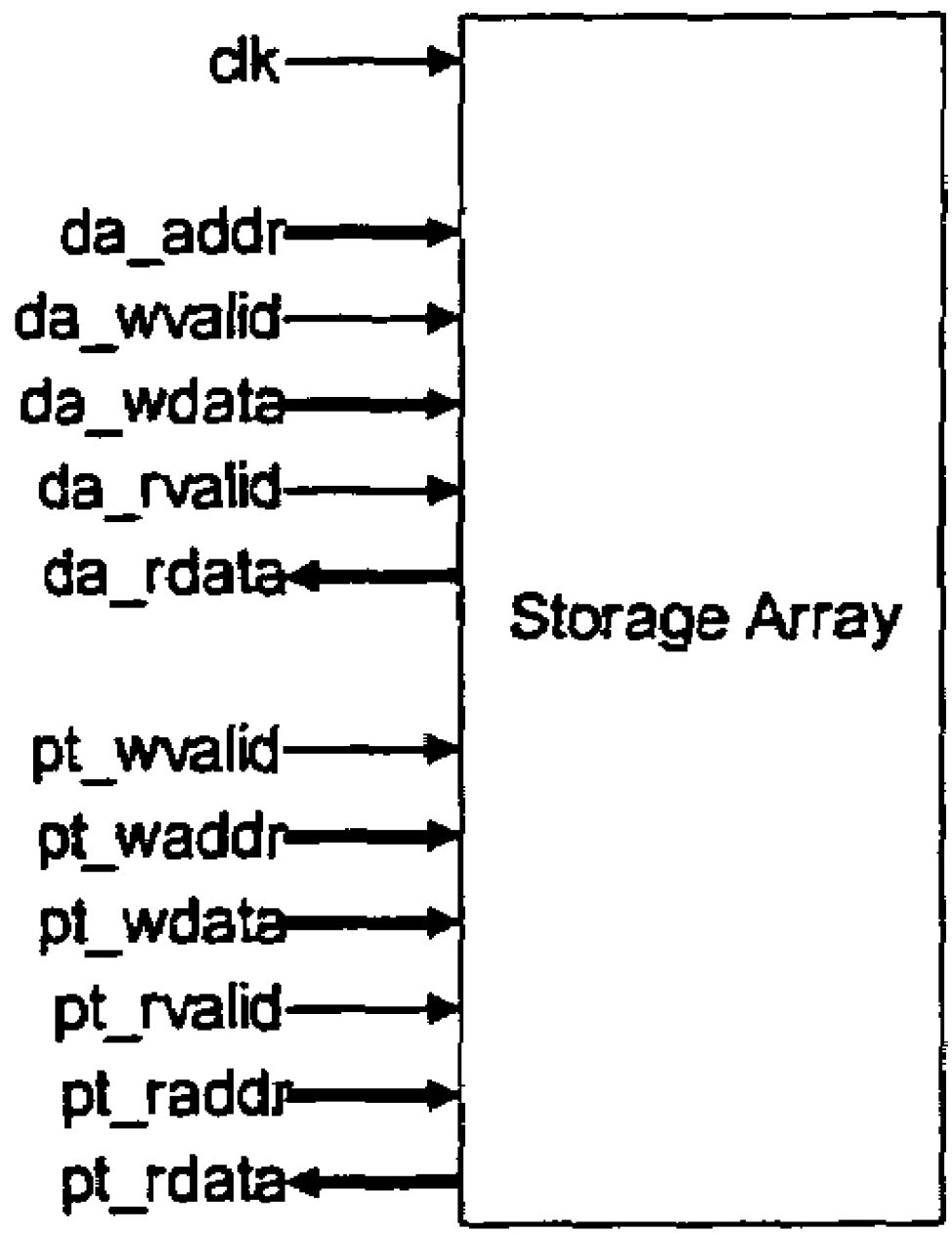
FIG. 13 shows a storage array port list.

Two interfaces provide data and pointer access. For data access, only a single address is required, as per the access requirements in the section on linked-list register organisation. Each interface has separate valid inputs for read and write accesses, partly for functional reasons and partly to lower power consumption by not performing unnecessary memory accesses. FIG. 13 shows a storage array port list Configurability The MFIFO can be configured for:
    Maximum number of Virtual FIFOs supported
    Data width
    Total FIFO depth (number of storage elements)

Each of this is controlled by a parameter, as described in the following sections. The Verilog implementation includes further related parameters to define widths of buses affected by the primary parameters

MAX_VFIFOS

Description

Maximum Number of VFIFOS Supported.

Allowable Range 1-32

Affected Logic
  Determines the width of the wid and rid input ports (see section on ID width):
    n=(round(log$_2$(MAX_VFIFOS),0)-1)
  Determines the number of VFIFO read/write pointers required

DATA_WIDTH

Description

Natural data-width of the data items stored in the VFIFOs

Allowable Range

Any, but will only be validated for certain options. These are likely to be:
  DATA_WIDTH=32 (32-bit data)
  DATA_WIDTH=36 (32-bit data+4-bit byte-strobe)
  DATA_WIDTH=64 (64-bit data)
  DATA_WIDTH=72 (64-bit data+8-bit byte-strobe)

Affected Logic
  Determines the width of the wdata and rdata input ports (see section 0):
    m=(DATA_WIDTH-1)
  Determines the width of the storage elements required

MFIFO_DEPTH

Description

Total number of storage elements in the MFIFO

Allowable Range

Any, but will only be validated for certain options. These are likely to be obvious power-of-2 values such as 4 (small DMAC), 16 (single-channel, full burst), 64 (quad-channel, full burst).

Affected Logic
  Determines the total size of the data storage required
  Determines the width and total size of the pointer storage required
  Determines the width of all pointer registers (VFIFO read/write, free head/tail)
  Determines the depth of the (de-)multiplexor logic required between the storage elements and the data ports

ID_WIDTH

Description

Verilog only. Width of ID buses (wid, rid)

Allowable Range

Must be set such that $2^{ID\_WIDTH}$ >=MAX_VFIFOS

Affected Logic
  Determines the width of the ID buses

MFIFO_ADDR_WIDTH

Description

Verilog only. Width of pointers and the pointer array

Allowable Range

Must be set such that $2^{MFIFO\_ADDR\_WIDTH}$ >=MFIFO_DEPTH

Affected Logic
  Determines the width of the pointer registers, array and comparison logic

| Port list | | |
|---|---|---|
| Port name | In/Out | Description |
| Global signals | | |
| clk | In | Clock |
| reset_n | In | Reset |
| MFIFO Control interface | | |
| cid[n:0] | In | Control channel ID (selects VFIFO to be cleared) |
| cvalid | In | Control channel valid handshake |
| cready | Out | Control channel ready handshake |
| MFIFO Write interface | | |
| wid[n:0] | In | Write channel ID (selects VFIFO) |
| wdata[m:0] | In | Write channel data |
| wvalid | In | Write channel valid handshake |
| wready | Out | Write channel ready handshake |
| MFIFO Read interface | | |
| rid[n:0] | In | Read channel ID (selects VFIFO) |
| rdata[m:0] | Out | Read channel data |
| rvalid | Out | Read channel valid handshake |
| Rready | In | Read channel ready handshake |

Timing

Cycle Timing Specification

Figure 14:
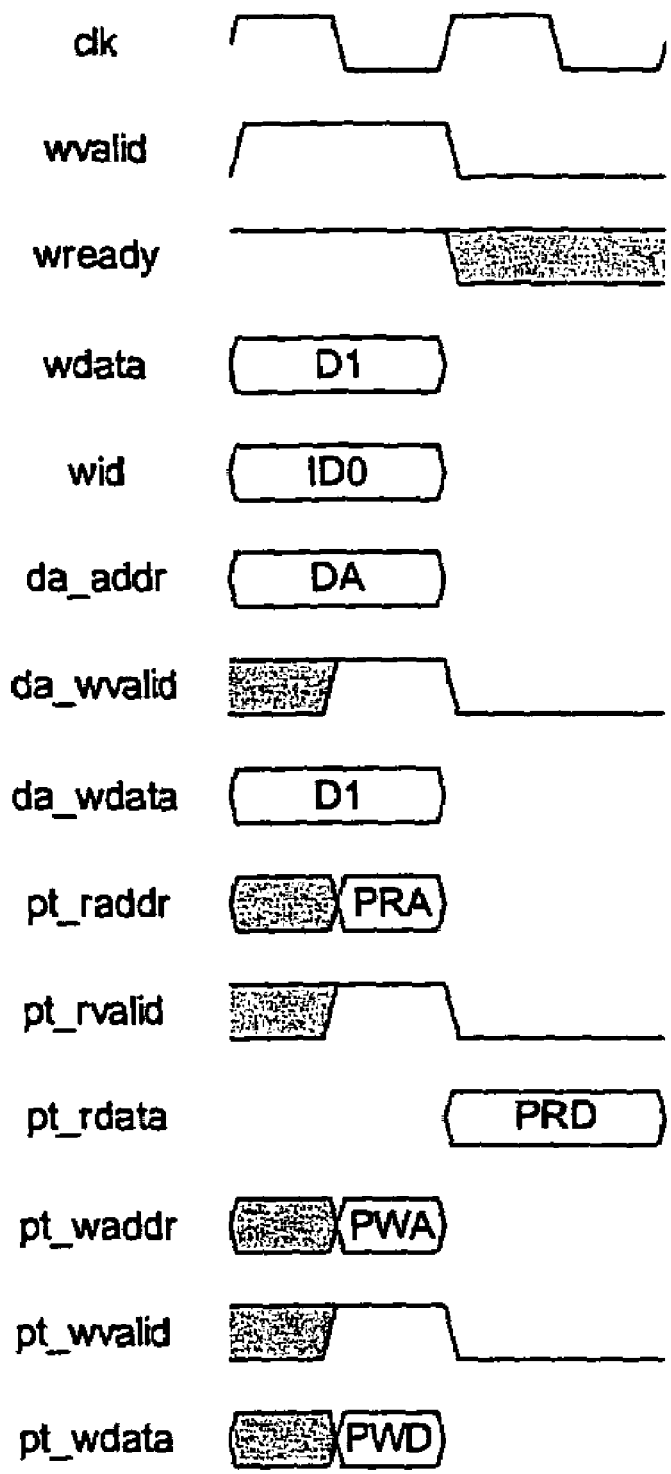
FIG. 14 shows the timing for a write access.
Figure 15:
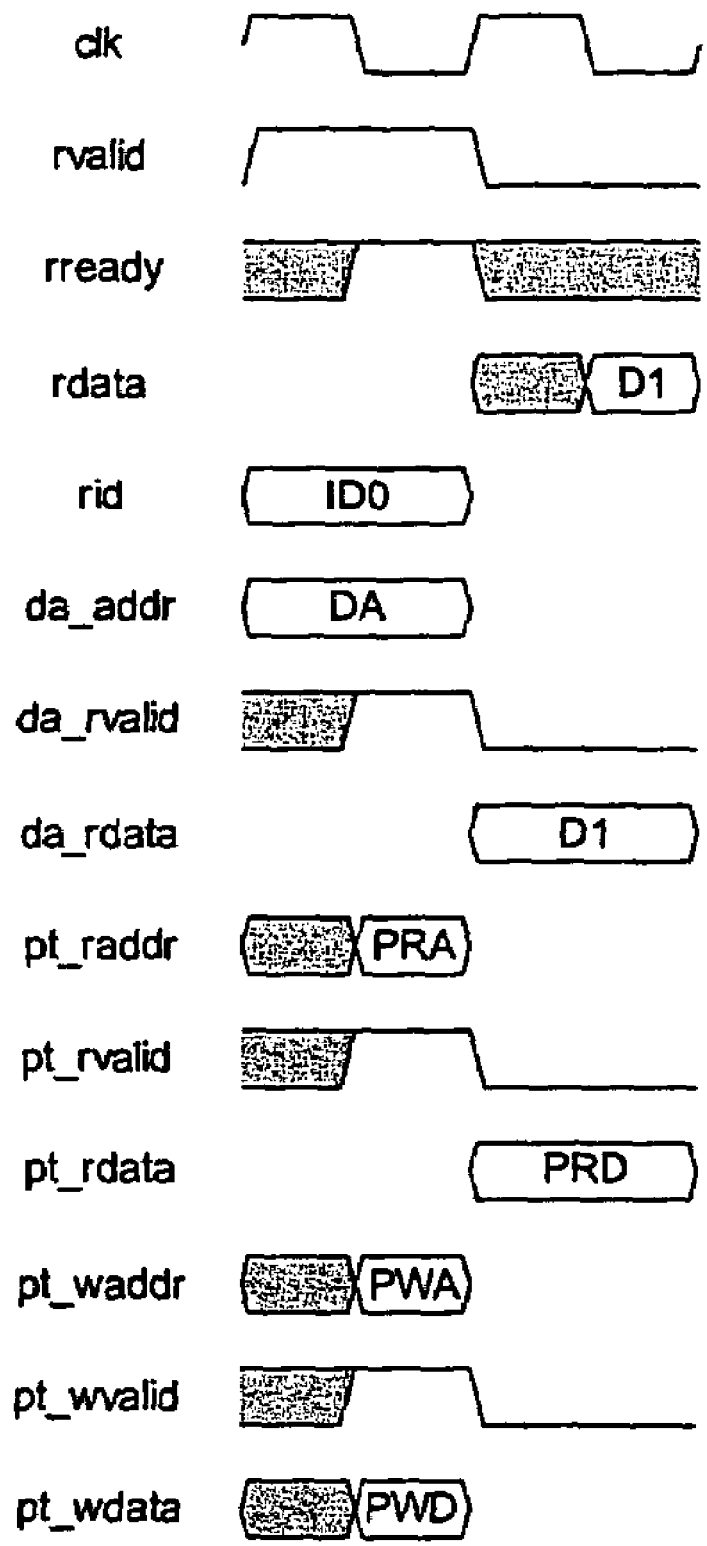
FIG. 15 shows the timing for a read access.
Figure 16:
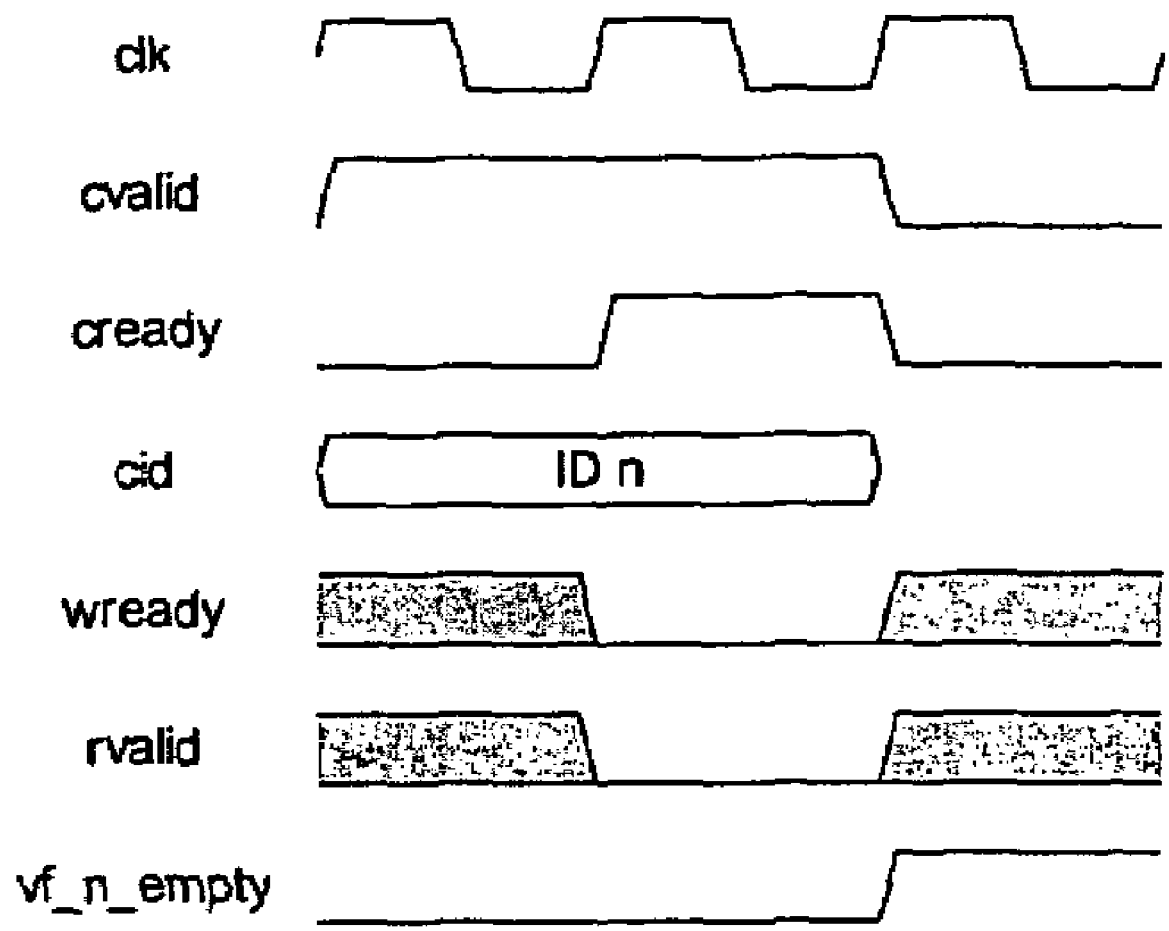
FIG. 16 shows the timing for clearing a virtual FIFO.

FIG. 14 shows the timing for a write access ("push")
FIG. 15 shows the timing for a Read access ("pop")
FIG. 16 shows the timing for clearing a VFIFO
The cready output is held low (de-asserted) by default. When a clear command is presented, it is registered and used to force the read and write interfaces inactive whilst the clear action is completed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A buffer for storing data being transferred using a plurality of control channels, a data item of said data being transferred between a data source and a data destination using one of said plurality of control channels, said buffer comprising:
  a data input port for receiving said data being transferred using said plurality of control channels;
  a data output port for outputting said data being transferred using said plurality of control channels; and
  a data store for storing data received from said data input port prior to it being output by said data output port as a plurality of groups of data items, wherein each group comprises data items received from a same one of said plurality of channels, and each data item within said group being stored in a storage location, said data store comprising free storage locations being storage locations not currently storing data and not currently allocated to one of said plurality of groups, wherein said data store is responsive to a data item received at said data input to store said data item in one of said free storage locations and then to allocate said one of said free storage locations to a respective group in dependence on said channel said data item was received from.

2. The buffer according to claim 1, wherein said data store comprises a plurality of storage locations each comprising storage space for a data value and a pointer value associated with said data value, wherein said data store is for storing data items within each group in the form of a linked list, with each data item being stored in one of said storage locations with a pointer value indicating a storage location of a subsequent data item within said linked list.

3. The buffer according to claim 2, wherein said plurality of linked lists corresponds to said plurality of channels.

4. The buffer according to claim 2, wherein said data store is configured so that said free storage locations not comprising data received from a particular channel form a free linked list, storage locations within said free linked list including storage space for a pointer value, said pointer value indicating a subsequent storage location in said free linked list.

5. The buffer according to claim 4, said buffer being responsive to receipt of a reset signal to allocate all of said storage locations to said free linked list, said buffer further comprising a counter, said counter being responsive to said reset signal to set said pointers associated with said all of said storage locations to indicate subsequent storage locations.

6. The buffer according to claim 2, said buffer further comprising:
control logic; and
a plurality of registers, comprising at least two registers corresponding to each of said linked lists, one of said two registers being configured to store a linked list write pointer indicating a storage location of a most recently stored data item for said corresponding linked list and said other of said two registers being configured to store a linked list read pointer, said read pointer indicating a storage location comprising a next data item to be output from said corresponding linked list.

7. The buffer according to claim 6, wherein said buffer further comprises a further plurality of registers corresponding to said plurality of linked lists for storing a value indicative of whether a respective linked list is empty or not.

8. The buffer according to claim 7, comprising a plurality of data valid outputs associated with said data input port, said plurality of data valid outputs being associated with said further plurality of registers and being configured to output a signal indicating if said linked list is empty or not.

9. The buffer according to claim 1, wherein said buffer further comprises a buffer full register for storing a value indicative of whether said buffer is full or not.

10. The buffer according to claim 9, said buffer comprising a buffer ready output associated with said write port and being controlled by a value stored in said buffer full register, said buffer ready output being responsive to said value stored in said buffer full register to output a signal indicative of whether said buffer is full or not.

11. The buffer according to claim 10, further comprising at least one reservation counter for holding a value, said value indicating a certain number of storage locations reserved for one of said groups.

12. The buffer according to claim 4, said buffer further comprising a register for storing a free write pointer for indicating a location at a tail of said free linked list.

13. The buffer according to claim 4, said buffer further comprising a register for storing a free read pointer, said free read pointer indicating a location at a head of said free linked list, that is a storage location for storing a next data item to be written to said buffer.

14. The buffer according to claim 13, said buffer further comprising:
control logic; and
a plurality of registers, comprising at least two registers corresponding to each of said linked lists, one of said two registers being configured to store a linked list write pointer indicating a storage location of a previously stored data item for said linked list and said other of said two registers being configured to store a linked list read pointer, said linked list read pointer indicating a storage location comprising a next data item to be output from said linked list; wherein
on receipt of said data item at said data input port transferred under control of said one of said plurality of channels said control logic is configured to control said buffer to:
store said data item in a storage location indicated by said free read pointer;
update a write pointer of a linked list associated with said one of said plurality of channels with said free read pointer and update said free read pointer with a pointer value stored associated with said storage location and update said pointer value stored associated with a storage location to which said write pointer of said linked list pointed to before being updated to point to said storage location in which said data item has been stored.

15. A direct memory access controller comprising:
a buffer according to claim 1;
a plurality of control channels for holding state information regarding data transfer between a plurality of data sources and a plurality of data destinations;
execution logic; and
a bus interface unit for receiving data from a data source and for transferring said data to said buffer using one of said control channels and for receiving said data from said buffer and for routing said data to said data destination using said one of said control channels.

16. A direct memory access controller according to claim 15, wherein said execution logic is configured to control transfer of said data using said plurality of channels.

17. A method of storing data being transferred using a plurality of control channels, a data item of said data being transferred between a data source and a data destination using one of said plurality of control channels, said data being stored within a data store comprising a plurality of storage locations, said storage locations being arranged in groups within said data store, each group comprising storage locations storing data items received from a same one of said plurality of control channels, said method comprising the steps of:
receiving said data item being transferred using said one of said plurality of control channels at a data input;
storing said data item received from said data input port in a free storage location within said data store, said free storage location being one not currently storing valid data and not currently allocated to one of said groups and allocating said free storage location to one of said groups in dependence on said one of said plurality of control channel that said data item is received from; and
outputting said data item from said data store to said one of said plurality of control channels at a data output port.

18. The method according to claim 17, wherein each of said plurality of groups is in the form of a linked list, with each data item within said linked list being stored in a storage location comprising storage space for a data value and a pointer value associated with said data value, said pointer value indicating a storage location of a subsequent data item within said linked list, and said step of allocating said storage location to a group, comprises updating a pointer value in a storage location storing a most recently received data item in said group to point to said free storage location

19. A computer-readable program product comprising a computer readable storage medium containing computer readable instructions for controlling a computer to perform a method as claimed in claim 17.

* * * * *